US012044880B2

(12) United States Patent
Hattori et al.

(10) Patent No.: US 12,044,880 B2
(45) Date of Patent: Jul. 23, 2024

(54) BACKLIGHT UNIT AND IMAGE DISPLAY DEVICE

(71) Applicant: NITTO DENKO CORPORATION, Ibaraki (JP)

(72) Inventors: Daisuke Hattori, Ibaraki (JP); Takahiro Yoshikawa, Ibaraki (JP); Ryota Morishima, Ibaraki (JP); Atsushi Kishi, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 17/914,510

(22) PCT Filed: Mar. 26, 2021

(86) PCT No.: PCT/JP2021/012771
§ 371 (c)(1),
(2) Date: Sep. 26, 2022

(87) PCT Pub. No.: WO2021/193896
PCT Pub. Date: Sep. 30, 2021

(65) Prior Publication Data

US 2023/0129382 A1 Apr. 27, 2023

(30) Foreign Application Priority Data

Mar. 27, 2020 (JP) ................................. 2020-058327

(51) Int. Cl.
*F21V 8/00* (2006.01)

(52) U.S. Cl.
CPC ......... *G02B 6/0088* (2013.01); *G02B 6/0055* (2013.01)

(58) Field of Classification Search
CPC .. G02B 6/0088; G02B 6/0055; G02B 6/0035; G02F 2202/28; G02F 1/13332;
(Continued)

(56) References Cited

U.S. PATENT DOCUMENTS 10,684,509 B2 * 6/2020 Jin ........................ G02B 6/0053
11,249,238 B2 2/2022 Rinko et al.
(Continued)

FOREIGN PATENT DOCUMENTS

CN 102648427 * 8/2012 ............. G02B 6/008
JP 2017-103168 A 6/2017
(Continued)

OTHER PUBLICATIONS

English Translation CN 102648427 Aug. 22, 2012 Wheatley et al.(Year: 2012).*
(Continued)

*Primary Examiner* — Peggy A Neils
(74) *Attorney, Agent, or Firm* — WHDA, LLP

(57) ABSTRACT

A backlight unit includes: a light source; a light guide plate having an end surface that is arranged to face the light source, and that light from the light source enters, and an emitting surface from which the entered light is emitted; a casing having a front portion and a back portion, the casing being configured to store the light source and the light guide plate; and an optical pressure-sensitive adhesive film arranged between the front portion of the casing on a light source side and the light guide plate, the optical pressure-sensitive adhesive film being bonded to the light guide plate. The optical pressure-sensitive adhesive film includes a light-absorbing layer, a substrate, a low-refractive index layer, and a pressure-sensitive adhesive layer in the stated order from a front portion side of the casing.

15 Claims, 1 Drawing Sheet

(58) Field of Classification Search
CPC ............. G02F 1/133331; G02F 1/1336; G02F 6/0035; F21S 2/00; F21V 2200/20; F21Y 2103/00; F21Y 2115/10
See application file for complete search history.

(56) References Cited

U.S. PATENT DOCUMENTS

| | | | | |
|---|---|---|---|---|
| 11,391,880 | B2 | 7/2022 | Rinko et al. | |
| 11,402,563 | B2 | 8/2022 | Rinko | |
| 2003/0202135 | A1 | 10/2003 | Ono et al. | |
| 2007/0031106 | A1* | 2/2007 | Yamashita | G02B 6/0011 385/146 |
| 2010/0289980 | A1 | 11/2010 | Husemann et al. | |
| 2018/0299610 | A1* | 10/2018 | Saito | G02B 6/0036 |
| 2019/0113796 | A1 | 4/2019 | Jin et al. | |
| 2020/0124784 | A1* | 4/2020 | Namikawa | G02B 6/0051 |
| 2020/0257044 | A1 | 8/2020 | Rinko | |
| 2020/0348462 | A1 | 11/2020 | Hattori et al. | |
| 2020/0355866 | A1 | 11/2020 | Hattori et al. | |
| 2021/0003766 | A1 | 1/2021 | Rinko | |
| 2021/0011211 | A1 | 1/2021 | Rinko | |
| 2021/0026086 | A1 | 1/2021 | Rinko et al. | |
| 2021/0048575 | A1 | 2/2021 | Rinko et al. | |
| 2021/0109274 | A1 | 4/2021 | Rinko et al. | |
| 2022/0035090 | A1 | 2/2022 | Rinko et al. | |

FOREIGN PATENT DOCUMENTS

| | | | |
|---|---|---|---|
| WO | 2019/146628 | A1 | 8/2019 |
| WO | 2019/151073 | A1 | 8/2019 |
| WO | 2019/182091 | A1 | 9/2019 |

OTHER PUBLICATIONS

International Search Report dated May 18, 2021, issued in counterpart application No. PCT/JP2021/012771. (2 pages).
International Search Report dated May 18, 2021, issued in counterpart application No. PCT/JP2021/021771. (2 pages).
Extended (Supplementary) European Search Report dated Mar. 5, 2024, issued in counterpart EP application No. 21775781.4. (5 pages).

* cited by examiner

BACKLIGHT UNIT AND IMAGE DISPLAY DEVICE

TECHNICAL FIELD

The present invention relates to a backlight unit.

BACKGROUND ART

A liquid crystal display apparatus has been used in a wide variety of applications including a portable terminal, a personal computer, a car navigation system, and a television. In the liquid crystal display apparatus, a planar backlight, which is arranged on the back surface side of its liquid crystal panel and emits light in a planar fashion, has been frequently used. An edge light (side light) system in which a light source is arranged to face the end surface of a light guide plate and light that has entered from the end surface is emitted from the emitting surface of the light guide plate is often adopted for the planar backlight. In the backlight of an edge light system, the back surface side of the light guide plate is typically bonded to a flexible printed circuit board (FPC) via a white diffusing tape. Meanwhile, the front surface side of the light guide plate is typically supported and fixed by the front portion of a casing in which the light guide plate is stored, and as a result, the entirety of the light guide plate is fixed in the casing. Such configuration has involved a problem in that a brightness loss occurs. To suppress such brightness loss, there has been proposed a technology including bonding the light guide plate and the FPC to each other via a double-sided pressure-sensitive adhesive film including a low-refractive index layer having a refractive index of 1.25 or less (Patent Literature 1). However, a further improvement in performance (e.g., brightness loss suppressibility (lightness) or light leakage suppressibility) of the backlight unit has been continuously required.

CITATION LIST

Patent Literature

[PTL 1] WO 2019/151073 A1

SUMMARY OF INVENTION

Technical Problem

The present invention has been made to solve the above-mentioned conventional problem, and a primary object of the present invention is to provide a backlight unit, which is bright and is suppressed from causing light leakage in an oblique direction.

Solution to Problem

A backlight unit according to one embodiment of the present invention includes: a light source; a light guide plate having an end surface that is arranged to face the light source, and that light from the light source enters, and an emitting surface from which the entered light is emitted; a casing having a front portion and a back portion, the casing being configured to store the light source and the light guide plate; and an optical pressure-sensitive adhesive film arranged between the front portion of the casing on a light source side and the light guide plate, the optical pressure-sensitive adhesive film being bonded to the light guide plate.

The optical pressure-sensitive adhesive film includes a light-absorbing layer, a substrate, a low-refractive index layer, and a pressure-sensitive adhesive layer in the stated order from a front portion side of the casing.

In one embodiment, the backlight unit further includes a reflective plate arranged in the casing on a back surface side of the light guide plate.

In one embodiment, the reflective plate is arranged via an air layer between the reflective plate and the light guide plate.

In one embodiment, the reflective plate and the light guide plate are bonded to each other via a double-sided pressure-sensitive adhesive film including a low-refractive index layer.

In one embodiment, the light source is a LED light source.

According to another aspect of the present invention, there is provided an image display apparatus. The image display apparatus includes: the backlight unit as described above; and an image display panel arranged on an emitting surface side of the light guide plate.

Advantageous Effects of Invention

According to the present invention, in the backlight unit, the optical pressure-sensitive adhesive film including the light-absorbing layer and the low-refractive index layer in a predetermined positional relationship is arranged between the front portion of the casing on the light source side and the light guide plate. Thus, the backlight unit, which is bright and is suppressed from causing light leakage in an oblique direction, can be achieved.

DESCRIPTION OF EMBODIMENTS

Embodiments of the present invention are described below. However, the present invention is not limited to these embodiments.

A. Overall Configuration of Backlight Unit

Figure 1:
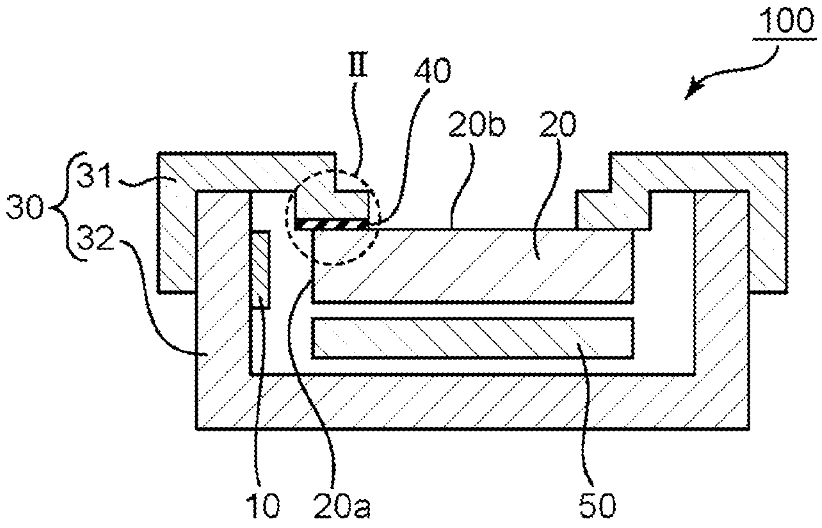
FIG. 1 is a schematic sectional view of a backlight unit according to one embodiment of the present invention.
Figure 2:
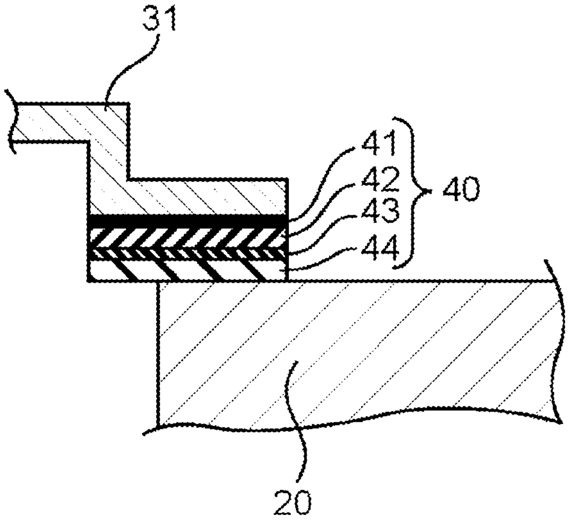
FIG. 2 is an enlarged schematic sectional view of the portion II of the backlight unit of FIG. 1.

FIG. 1 is a schematic sectional view of a backlight unit according to one embodiment of the present invention, and FIG. 2 is an enlarged schematic sectional view of the portion II of the backlight unit of FIG. 1. A backlight unit 100 of the illustrated example includes a light source 10, a light guide plate 20, a casing 30, and an optical pressure-sensitive adhesive film 40. The casing 30 has a front portion 31 and a back portion 32, and stores the light source 10 and the light guide plate 20. The back portion 32 has a box shape whose upper portion (front surface side) is opened, and in a pair of end portions of the back portion 32 opposing each other, the front portion 31 protrudes inward from the back portion in the illustrated example. The front portion 31 may not protrude inward in the end portions. The front portion 31 and the back portion 32 are typically fixed to and integrated with each other. The light guide plate 20 can be typically fit into the casing 30. Any appropriate optical member (not shown) may be typically mounted (bridged) on the step portions (portions protruding inward) of the front portion. No step portions may be arranged in the front portion. Examples of the optical member include a diffusing sheet and a prism sheet. The diffusing sheet and/or the prism sheet may be mounted in plurality. The casing 30 of the illustrated example may be a part of the back portion of the casing for storing the entirety of an image display apparatus.

The light source 10 is arranged on one end portion side of the light guide plate 20 to face an end surface 20*a* of the light guide plate. Accordingly, the backlight unit is typically an edge light system. The light source 10 is typically surrounded by a reflector (not shown). Any appropriate configuration may be adopted as the light source. Specific examples thereof include a light emitting diode (LED), a cold cathode fluorescent lamp (CCFL), an external electrode fluorescent lamp (EEFL), and a hot cathode fluorescent lamp (HCFL). In one embodiment, a LED light source may be used. The LED light source may be typically formed by arranging LEDs (point light sources) in a line.

The light guide plate 20 has the end surface 20*a* that light from the light source enters and an emitting surface 20*b* from which the entered light is emitted. The end surface 20*a* of the light guide plate 20 is arranged to face the light source 10. More specifically, the light guide plate 20 guides the light that has entered the end surface 20*a* from the light source 10 toward an end portion opposite to the end surface 20*a* while subjecting the light to a reflective action or the like therein, and in the light guide process, the plate gradually emits the light from the emitting surface 20*b*. An emission pattern is typically arranged on the emitting surface 20*b*. The emission pattern is, for example, an uneven shape. Further, a light extraction pattern is typically arranged on the surface of the light guide plate opposite to the emitting surface. The light extraction pattern is, for example, a white dot. Any appropriate configuration may be adopted as the light guide plate. In one embodiment, the back surface side of the light guide plate 20 is bonded to a flexible printed circuit board for a light source via any appropriate means (e.g., a pressure-sensitive adhesive tape).

In the embodiment of the present invention, the optical pressure-sensitive adhesive film 40 is arranged between the front portion 31 of the casing 30 on the light source 10 side and the light guide plate 20. The optical pressure-sensitive adhesive film 40 includes a light-absorbing layer 41, a substrate 42, a low-refractive index layer 43, and a pressure-sensitive adhesive layer 44 in the stated order from the front portion 31 side of the casing 30. Part of the optical pressure-sensitive adhesive film 40 is bonded to the light guide plate 20 via the pressure-sensitive adhesive layer 44. According to such configuration, light can be reflected and guided by the total reflection function of the low-refractive index layer of the optical pressure-sensitive adhesive film even in a portion where the light guide plate is out of contact with a space (air portion) (i.e., a portion where the plate is brought into contact with the front portion of the casing), and light, which enters the low-refractive index layer at an incident angle equal to or more than a critical angle and is not reflected by the low-refractive index layer, can be absorbed by the light-absorbing layer. As a result, light utilization efficiency can be further improved, and hence the lightness of the backlight unit is improved. In addition, light that cannot be utilized and hence leaks can be absorbed and shielded, and hence light leakage (in particular, light leakage in an oblique direction) can be suppressed. Although the optical pressure-sensitive adhesive film protrudes from the light guide plate toward the light source in the illustrated example, the end surface of the optical pressure-sensitive adhesive film and the end surface of the light guide plate may be flush with each other.

The backlight unit 100 may further include a reflective plate 50 arranged in the casing 30 on the back surface side of the light guide plate 20. The reflective plate 50 may be arranged via an air layer between the reflective plate and the light guide plate 20 (i.e., the reflective plate may be stored in the casing separately from the light guide plate), or the reflective plate 50 and the light guide plate 20 may be bonded to each other via a double-sided pressure-sensitive adhesive film (not shown) including a low-refractive index layer. In the illustrated example, a configuration in which the air layer is interposed between the reflective plate 50 and the light guide plate 20 is illustrated. Any appropriate reflective plate may be used as the reflective plate 50. For example, the reflective plate may be a mirror-surface reflective plate or a diffusing reflective plate. Specific examples of the reflective plate include: a resin sheet having a high reflectance (e.g., an acrylic plate); a metal thin plate or metal foil made of aluminum, stainless steel, or the like; a deposited sheet obtained by depositing aluminum, silver, or the like from the vapor onto a substrate such as a resin film made of polyester or the like; a laminate of a substrate such as a resin film made of polyester or the like and metal foil made of aluminum or the like; and a resin film having formed therein voids. The arrangement of the reflective plate 50 can improve light utilization efficiency in the backlight unit.

The optical pressure-sensitive adhesive film 40 and the double-sided pressure-sensitive adhesive film are described in detail below.

B. Optical Pressure-Sensitive Adhesive Film

B-1. Outline of Optical Pressure-Sensitive Adhesive Film

As described in the section A, the optical pressure-sensitive adhesive film 40 includes the light-absorbing layer 41, the substrate 42, the low-refractive index layer 43, and the pressure-sensitive adhesive layer 44 in the stated order from the front portion 31 side of the casing 30.

B-2. Light-Absorbing Layer

The light-absorbing layer 41 may be a design layer having arranged thereon a predetermined design, or may be a solid colored layer. The light-absorbing layer is preferably a solid colored layer, more preferably a black colored layer. When such light-absorbing layer is arranged on the front surface side of the casing with respect to the low-refractive index layer, the light, which enters the low-refractive index layer at an incident angle equal to or more than the critical angle and is not reflected by the low-refractive index layer, can be satisfactorily absorbed and shielded.

The total light transmittance of the light-absorbing layer in a thickness of from 3 μm to 5 μm is preferably 0.01% or less, more preferably 0.008% or less. The total light transmittance of the light-absorbing layer is preferably as small as possible, and its lower limit may be, for example, 0.001%. When the total light transmittance of the light-absorbing layer falls within such ranges, the layer can achieve more excellent light-absorbing and shielding functions.

The thickness of the light-absorbing layer is preferably from 0.1 μm to 300 μm. When the thickness falls within such range, appropriate selection of a material for forming the layer facilitates the achievement of a desired total light transmittance (consequently, desired light-absorbing and shielding functions).

The light-absorbing layer may be formed by any appropriate printing method using any appropriate ink or paint. Specific examples of the printing method include ink jet printing, gravure printing, offset printing, silkscreen printing, and transfer printing from a transfer sheet.

The ink or paint to be used typically contains a binder, a colorant, a solvent, and any appropriate additive that may be used as required. Examples of the binder include chlorinated polyolefins (e.g., chlorinated polyethylene and chlorinated polypropylene), a polyester-based resin, a urethane-based resin, an acrylic resin, a vinyl acetate resin, a vinyl chloride-vinyl acetate copolymer, and a cellulose-based resin. The binder resins may be used alone or in combination thereof. The binder resin may be a thermally polymerizable resin or a photopolymerizable resin. In one embodiment, the binder resin is an acrylic resin, preferably an acrylic resin containing a polyfunctional monomer (e.g., pentaerythritol triacrylate) as a copolymerization component. When the acrylic resin containing a polyfunctional monomer as a copolymerization component is used, a colored layer having an appropriate modulus of elasticity can be formed.

Any appropriate colorant may be used as the colorant depending on purposes. Specific examples of the colorant include: inorganic pigments, such as titanium white, zinc white, carbon black, iron black, iron oxide red, chrome vermilion, ultramarine, cobalt blue, chrome yellow, and titanium yellow; organic pigments or dyes, such as phthalocyanine blue, indanthrene blue, isoindolinone yellow, benzidine yellow, quinacridone red, polyazo red, perylene red, and aniline black; metal pigments formed of scale-like foil pieces of aluminum, brass, and the like; and pearlescent pigments (pearl pigments) formed of scale-like foil pieces of titanium dioxide-coated mica, basic lead carbonate, and the like. When the black colored layer is formed, carbon black, iron black, or aniline black is suitably used. In this case, the colorants are preferably used in combination thereof. This is because a colored layer having no hue (that is, being jet black) by absorbing visible light in a wide range and uniformly can be formed. For example, in addition to the above-mentioned colorant, an azo compound and/or a quinone compound may be used. In one embodiment, the colorant contains the carbon black as a main component and another colorant (e.g., an azo compound and/or a quinone compound). According to such configuration, a colored layer having no hue and being excellent in temporal stability can be formed. When the black colored layer is formed, the colorant may be used at a ratio of preferably from 1 part by weight to 200 parts by weight with respect to 100 parts by weight of the binder resin. In this case, the content of the carbon black in the colorant is preferably from 1% to 100%. When the colorant (in particular, the carbon black) is used at such ratio, a colored layer having an extremely low total light transmittance and being excellent in temporal stability can be formed.

B-3. Substrate

The substrate 42 may be typically formed of a film or plate-shaped product of a resin (preferably a transparent resin). Typical examples of such resin include a thermoplastic resin and a reactive resin (e.g., an ionizing radiation-curable resin). Specific examples of the thermoplastic resin include: a (meth)acrylic resin, such as polymethyl methacrylate (PMMA) or polyacrylonitrile; a polycarbonate (PC) resin; a polyester resin such as PET; a cellulose-based resin such as triacetyl cellulose (TAC); a cyclic polyolefin-based resin; and a styrene-based resin. Specific examples of the ionizing radiation-curable resin include an epoxy acrylate-based resin and a urethane acrylate-based resin. Those resins may be used alone or in combination thereof.

The thickness of the substrate is, for example, from 10 μm to 100 μm, preferably from 10 μm to 50 μm.

The refractive index of the substrate is preferably 1.47 or more, more preferably from 1.47 to 1.60, still more preferably from 1.47 to 1.55. When the refractive index falls within such ranges, light extracted from the light guide plate can be introduced into an image display cell without being adversely affected.

B-4. Low-Refractive Index Layer

The low-refractive index layer typically has pores therein. The porosity of the low-refractive index layer is, for example, 40% or more, typically 50% or more, preferably 70% or more, more preferably 80% or more. Meanwhile, the porosity is, for example, 90% or less, preferably 85% or less. When the porosity falls within the ranges, the refractive index of the low-refractive index layer can be set within an appropriate range. The porosity is a value calculated from the value of the refractive index measured with an ellipsometer by using Lorentz-Lorenz's formula.

The refractive index of the low-refractive index layer is preferably 1.30 or less, more preferably 1.20 or less, still more preferably 1.15 or less. The lower limit of the refractive index may be, for example, 1.01. When the refractive index falls within such ranges, extremely excellent light utilization efficiency can be achieved in the backlight unit. The refractive index refers to a refractive index measured at a wavelength of 550 nm unless otherwise stated. The refractive index is a value measured by a method described in the section "(1) Refractive Index of Low-refractive Index Layer" in Examples below.

Any appropriate configuration may be adopted for the low-refractive index layer as long as the layer has the above-mentioned desired porosity and refractive index. The low-refractive index layer may be preferably formed through, for example, application or printing. Materials described in, for example, WO 2004/113966 A1, JP 2013-254183 A, and JP 2012-189802 A may each be adopted as a material for forming the low-refractive index layer. Specific examples thereof include: silica-based compounds; hydrolyzable silanes, and partial hydrolysates and dehydration condensates thereof; organic polymers; silanol group-containing silicon compounds; active silica obtained by bringing a silicate into contact with an acid or an ion-exchange resin; polymerizable monomers (e.g., a (meth) acrylic monomer and a styrene-based monomer); curable resins (e.g., a (meth)acrylic resin, a fluorine-containing resin, and a urethane resin); and combinations thereof. The low-refractive index layer may be formed by, for example, applying or printing a solution or a dispersion liquid of such material.

The size of each of the pores (holes) in the low-refractive index layer refers to a major axis diameter out of the major axis diameter and minor axis diameter of the pore (hole). The sizes of the pores (holes) are, for example, from 2 nm to 500 nm. The sizes of the pores (holes) are, for example, 2 nm or more, preferably 5 nm or more, more preferably 10 nm or more, still more preferably 20 nm or more. Meanwhile, the sizes of the pores (holes) are, for example, 500 nm or less, preferably 200 nm or less, more preferably 100 nm or less. The range of the sizes of the pores (holes) is, for example, from 2 nm to 500 nm, preferably from 5 nm to 500 nm, more preferably from 10 nm to 200 nm, still more preferably from 20 nm to 100 nm. The sizes of the pores (holes) may be adjusted to desired sizes in accordance with, for example, a purpose and an application. The sizes of the pores (holes) may be quantified by a BET test method.

The sizes of the pores (holes) may be quantified by a BET test method. Specifically, 0.1 g of the sample (formed pore layer) is loaded into the capillary of a specific surface area-measuring apparatus (manufactured by Micromeritics Instrument Corporation, ASAP 2020), and is then dried under reduced pressure at room temperature for 24 hours so that a gas in its pore structure may be removed. Then, an adsorption isotherm is drawn by causing the sample to adsorb a nitrogen gas, and its pore size distribution is determined. Thus, the pore sizes may be evaluated.

The haze of the low-refractive index layer is, for example, less than 5%, preferably less than 3%. Meanwhile, the haze is, for example, 0.1% or more, preferably 0.2% or more. The range of the haze is, for example, 0.1% or more and less than 5%, preferably 0.2% or more and less than 3%. The haze is an indicator of the transparency of the low-refractive index layer, and may be measured by, for example, such a method as described below.

The pore layer (low-refractive index layer) is cut into a size measuring 50 mm by 50 mm, and is set in a haze meter (manufactured by Murakami Color Research Laboratory Co., Ltd.: HM-150), followed by the measurement of its haze. The haze value is calculated from the following equation.

$$\text{Haze } (\%)=[\text{diffuse transmittance } (\%)/\text{total light transmittance } (\%)]\times 100(\%)$$

The low-refractive index layer having the pores therein is, for example, a low-refractive index layer having a porous layer and/or an air layer in at least part thereof. The porous layer typically contains aerogel and/or particles (e.g., hollow fine particles and/or porous particles). The low-refractive index layer may be preferably a nanoporous layer (specifically a porous layer in which the diameters of 90% or more of micropores fall within the range of from $10^{-1}$ nm to $10^{3}$ nm).

Any appropriate particles may be adopted as the particles. The particles are each typically formed of a silica-based compound. Examples of the shapes of the particles include a spherical shape, a plate shape, a needle shape, a string shape, and a botryoidal shape. String-shaped particles are, for example, particles in which a plurality of particles each having a spherical shape, a plate shape, or a needle shape are strung together like beads, short fiber-shaped particles (e.g., short fiber-shaped particles described in JP 2001-188104 A), and a combination thereof. The string-shaped particles may be linear or may be branched. Botryoidal-shaped particles are, for example, particles in which a plurality of spherical, plate-shaped, and needle-shaped particles aggregate to form a botryoidal shape. The shapes of the particles may be identified through, for example, observation with a transmission electron microscope.

The thickness of the low-refractive index layer is preferably from 0.2 μm to 5 μm, more preferably from 0.3 μm to 3 μm. When the thickness of the low-refractive index layer falls within such ranges, a damage-preventing effect exhibited by the present invention becomes significant. Further, the above-mentioned desired thickness ratio can be easily achieved.

An example of a specific configuration of the low-refractive index layer is described below. The low-refractive index layer of this embodiment is formed of one or a plurality of kinds of constituent units each forming a fine pore structure, and the constituent units are chemically bonded to each other through a catalytic action. Examples of the shape of each of the constituent units include a particle shape, a fiber shape, a rod shape, and a flat plate shape. The constituent units may have only one shape, or may have two or more shapes in combination. In the following description, a case in which the low-refractive index layer is a pore layer of a porous body in which the microporous particles are chemically bonded to each other is mainly described.

Such pore layer may be formed by, for example, chemically bonding the microporous particles to each other in a pore layer-forming step. In the embodiment of the present invention, the shapes of the "particles" (e.g., the microporous particles) are not particularly limited. For example, the shapes may each be a spherical shape, or may each be any other shape. In addition, in the embodiment of the present invention, the microporous particles may be, for example, sol-gel beaded particles, nanoparticles (hollow nanosilica nanoballoon particles), or nanofibers. The microporous particles each typically contain an inorganic substance. Specific examples of the inorganic substance include silicon (Si), magnesium (Mg), aluminum (Al), titanium (Ti), zinc (Zn), and zirconium (Zr). Those inorganic substances may be used alone or in combination thereof. In one embodiment, the microporous particles are, for example, microporous particles of a silicon compound, and the porous body is, for example, a silicone porous body. The microporous particles of the silicon compound each contain, for example, a pulverized body of a gel-like silica compound. In addition, another form of the low-refractive index layer having the porous layer and/or the air layer in at least part thereof is, for example, a pore layer having the following features: the layer is formed of fibrous substances such as nanofibers; and the fibrous substances are entangled with each other to form pores, thereby forming the layer. A method of producing such pore layer is not particularly limited, and is the same as that in the case of, for example, the pore layer of the porous body in which the microporous particles are chemically bonded to each other. Still another form thereof is, for example, a pore layer using hollow nanoparticles or nanoclay, or a pore layer formed by using hollow nanoballoons or magnesium fluoride. The pore layer may be a pore layer formed of a single constituent substance, or may be a pore layer formed of a plurality of constituent substances. The pore layer may include any one of the above-mentioned forms, or may include two or more of the above-mentioned forms.

In this embodiment, the porous structure of the porous body may be, for example, an open-cell structural body in which hole structures are continuous with each other. The open-cell structural body means, for example, that the hole structures are three-dimensionally continuous with each other in the silicone porous body, and can be said to be a state in which the internal pores of the hole structures are continuous with each other. When the porous body has an open-cell structure, its porosity can be increased. However, when closed-cell particles (particles each individually having a hole structure) such as hollow silica are used, an open-cell structure cannot be formed. Meanwhile, for example, when silica sol particles (pulverized products of a gel-like silicon compound that forms sol) are used, the particles each have a three-dimensional dendritic structure, and hence the dendritic particles are sedimented and deposited in a coating film (coating film of the sol containing the pulverized products of the gel-like silicon compound). Accordingly, an open-cell structure can be easily formed. The low-refractive index layer more preferably has a monolith structure in which an open-cell structure includes a plurality of pore size distributions. The monolith structure means, for example, a hierarchical structure including a structure in which nanosized fine pores are present and an open-cell structure in which the nanosized pores assemble. When the monolith structure is formed, both of film strength and a high porosity may be achieved by, for example, imparting the high porosity to the layer through use of a coarse open-cell pore while imparting the film strength thereto through use of a fine pore. Such monolith structure may be preferably formed by controlling the pore size distribution of a pore structure to be produced in the gel (gel-like silicon compound) at a stage before its pulverization into the silica sol particles. In addition, the monolith structure may be formed by, for example, controlling the particle size distribution of the silica sol particles after the pulverization to a desired size at the time of the pulverization of the gel-like silicon compound.

The low-refractive index layer contains, for example, the pulverized products of a gel-like compound as described above, and the pulverized products are chemically bonded to each other. The form of the chemical bond (chemical bonding) between the pulverized products in the low-refractive index layer is not particularly limited, and examples thereof include a cross-linking bond, a covalent bond, and a hydrogen bond.

The volume-average particle diameter of the pulverized products in the low-refractive index layer is, for example, 0.10 μm or more, preferably 0.20 μm or more, more preferably 0.40 μm or more. Meanwhile, the volume-average particle diameter is, for example, 2.00 μm or less, preferably 1.50 μm or less, more preferably 1.00 μm or less. The range of the volume-average particle diameter is, for example, from 0.10 μm to 2.00 μm, preferably from 0.20 μm to 1.50 μm, more preferably from 0.40 μm to 1.00 μm. The particle size distribution of the pulverized products may be measured with, for example, a particle size distribution-evaluating apparatus based on a dynamic light scattering method, a laser diffraction method, or the like, and an electron microscope, such as a scanning electron microscope (SEM) or a transmission electron microscope (TEM). The volume-average particle diameter is an indicator of a variation in particle size of the pulverized products.

The kind of the gel-like compound is not particularly limited. The gel-like compound is, for example, a gel-like silicon compound.

In addition, in the low-refractive index layer (pore layer), for example, silicon atoms to be incorporated preferably form a siloxane bond. As a specific example, the ratio of unbonded silicon atoms (in other words, residual silanol groups) out of all the silicon atoms in the pore layer is, for example, less than 50%, preferably 30% or less, more preferably 15% or less.

An example of a method of forming such low-refractive index layer is described below.

The method typically includes: a precursor-forming step of forming a pore structure, which is a precursor of the low-refractive index layer (pore layer), on a resin film; and a cross-linking reaction step of causing a cross-linking reaction in the precursor after the precursor-forming step. The method further includes: a containing liquid-producing step of producing a containing liquid containing microporous particles (hereinafter sometimes referred to as "microporous particle-containing liquid" or simply "containing liquid"); and a drying step of drying the containing liquid. In the precursor-forming step, the microporous particles in a dried body are chemically bonded to each other to form the precursor. The containing liquid is not particularly limited, and is, for example, a suspension containing the microporous particles. In the following, a case in which the microporous particles are pulverized products of the gel-like compound, and the pore layer is a porous body (preferably a silicone porous body) containing the pulverized products of the gel-like compound is mainly described. However, even when the microporous particles are products except the pulverized products of the gel-like compound, the low-refractive index layer may be similarly formed.

According to the above-mentioned method, for example, a low-refractive index layer (pore layer) having an extremely low refractive index is formed. A reason for the foregoing is assumed to be, for example, as described below. However, the assumption does not limit the method of forming the low-refractive index layer.

The above-mentioned pulverized products are obtained by pulverizing the gel-like silicon compound, and hence a state in which the three-dimensional structure of the gel-like silicon compound before the pulverization is dispersed in a three-dimensional basic structure is established. Further, in the above-mentioned method, the application of the crushed products of the gel-like silicon compound onto the resin film results in the formation of the precursor of a porous structure based on the three-dimensional basic structure. In other words, according to the method, a new porous structure (three-dimensional basic structure) different from the three-dimensional structure of the gel-like silicon compound is formed by the application of the pulverized products. Accordingly, in the pore layer to be finally obtained, such a low refractive index that the layer functions to the same extent as, for example, an air layer does may be achieved. Further, in the method, the three-dimensional basic structure is fixed because the pulverized products are chemically bonded to each other. Accordingly, the pore layer to be finally obtained can maintain sufficient strength and sufficient flexibility despite the fact that the layer is a structure having pores.

Details about specific configurations of the low-refractive index layer and the method of forming the low-refractive index layer are described in, for example, WO 2019/151073 A1, the description of which is incorporated herein by reference.

B-5. Pressure-Sensitive Adhesive Layer

The pressure-sensitive adhesive layer has such hardness that under a normal state, a pressure-sensitive adhesive for forming the pressure-sensitive adhesive layer does not permeate the pores of the low-refractive index layer. The storage modulus of elasticity of the pressure-sensitive adhesive layer at 23° C. is, for example, from $1.0\times10^5$ (Pa) to $1.0\times10^7$ (Pa). The storage modulus of elasticity is, for example, $1.1\times10^5$ (Pa) or more, $1.2\times10^5$ (Pa) or more, $1.3\times10^5$ (Pa) or more, $1.4\times10^5$ (Pa) or more, $1.5\times10^5$ (Pa) or more, $1.6\times10^5$ (Pa) or more, $1.7\times10^5$ (Pa) or more, $1.8\times10^5$ (Pa) or more, $1.9\times10^5$ (Pa) or more, or $2.0\times10^5$ (Pa) or more, and $1.0\times10^7$ (Pa) or less, $5.0\times10^6$ (Pa) or less, $1.0\times10^6$ (Pa) or less, or $5.0\times10^5$ (Pa) or less. The storage modulus of elasticity is preferably from $1.3\times10^5$ (Pa) to $1.0\times10^6$ (Pa), more preferably from $1.5\times10^5$ (Pa) to $5.0\times10^5$ (Pa). The storage modulus of elasticity is determined by reading a value at 23° C. at the time of measurement in conformity with a method described in JIS K 7244-1 "Plastics-Determination of dynamic mechanical properties" under the condition of a frequency of 1 Hz in the range of from −50° C. to 150° C. at a rate of temperature increase of 5° C./min. When the storage modulus of elasticity of the pressure-sensitive adhesive layer adjacent to the low-refractive index layer is set within such ranges as described above, the pressure-sensitive adhesive can be prevented from entering the pores of the low-refractive index layer. Accordingly, the refractive index of the low-refractive index layer is maintained low, and the lowering effect can be maintained.

Any appropriate pressure-sensitive adhesive may be used as the pressure-sensitive adhesive for forming the pressure-sensitive adhesive layer as long as the pressure-sensitive adhesive has such characteristic as described above. The pressure-sensitive adhesive is typically, for example, an acrylic pressure-sensitive adhesive (acrylic pressure-sensitive adhesive composition). The acrylic pressure-sensitive adhesive composition typically contains a (meth)acrylic polymer as a main component (base polymer). The (meth) acrylic polymer may be incorporated into the pressure-sensitive adhesive composition at a ratio of, for example, 50 wt % or more, preferably 70 wt % or more, more preferably 90 wt % or more in the solid content of the pressure-sensitive adhesive composition. The (meth)acrylic polymer contains, as a main component, an alkyl (meth)acrylate serving as a monomer unit. The term "(meth)acrylate" refers to an acrylate and/or a methacrylate. The alkyl group of the alkyl (meth)acrylate is, for example, a linear or branched alkyl group having 1 to 18 carbon atoms. The average number of carbon atoms of the alkyl group is preferably from 3 to 9. As a monomer for forming the (meth)acrylic polymer, in addition to the alkyl (meth)acrylate, there are given comonomers, such as a carboxyl group-containing monomer, a hydroxyl group-containing monomer, an amide group-containing monomer, an aromatic ring-containing (meth)acrylate, and a heterocycle-containing (meth)acrylate. The comonomer is preferably a hydroxyl group-containing monomer and/or a heterocycle-containing (meth) acrylate, more preferably N-acryloylmorpholine. The acrylic pressure-sensitive adhesive composition may preferably contain a silane coupling agent and/or a cross-linking agent. The silane coupling agent is, for example, an epoxy group-containing silane coupling agent. The cross-linking agent is, for example, an isocyanate-based cross-linking agent or a peroxide-based cross-linking agent. Details about such pressure-sensitive adhesive layer or acrylic pressure-sensitive adhesive composition are described in, for example, JP 4140736 B2, the description of which is incorporated herein by reference.

The thickness of the pressure-sensitive adhesive layer is preferably from 3 μm to 30 μm, more preferably from 5 μm to 10 μm. When the thickness of the pressure-sensitive adhesive layer falls within such ranges, the following advantage is obtained: an influence of the thickness of the pressure-sensitive adhesive layer on the entire thickness of the backlight unit is small while the layer has a sufficient adhesive strength.

C. Double-Sided Pressure-Sensitive Adhesive Film

The double-sided pressure-sensitive adhesive film typically includes a first pressure-sensitive adhesive layer, a substrate, the low-refractive index layer, and a second pressure-sensitive adhesive layer in the stated order. The substrate and the low-refractive index layer are the same as the substrate and low-refractive index layer of the optical pressure-sensitive adhesive film described in the section B-3 and the section B-4, respectively. The second pressure-sensitive adhesive layer is the same as the pressure-sensitive adhesive layer of the optical pressure-sensitive adhesive film described in the section B-5. The first pressure-sensitive adhesive layer includes any appropriate pressure-sensitive adhesive. The first pressure-sensitive adhesive layer may be identical to or different from the second pressure-sensitive adhesive layer.

D. Image Display Apparatus

The backlight unit may be suitably used in an image display apparatus (e.g., a liquid crystal display). Accordingly, the embodiment of the present invention also encompasses such image display apparatus. The image display apparatus includes the backlight unit described above and an image display panel arranged on the emitting surface side of the light guide plate of the unit.

EXAMPLES

Now, the present invention is specifically described by way of Examples. However, the present invention is not limited to these Examples. Measurement methods for characteristics are as described below. In addition, unless otherwise specified, "%" and "part(s)" in Examples are by weight.

(1) Refractive Index of Low-Refractive Index Layer

After a low-refractive index layer had been formed on an acrylic film, the resultant was cut into a size measuring 50 mm by 50 mm, and the piece was bonded to the front surface of a glass plate (thickness: 3 mm) via a pressure-sensitive adhesive layer. A central portion (having a diameter of about 20 mm) on the rear surface of the glass plate was daubed with a black marker pen. Thus, a sample in which light was not reflected on the rear surface of the glass plate was obtained. The sample was set in an ellipsometer (manufactured by J.A. Woollam Japan: VASE), and its refractive index was measured under the conditions of a wavelength of 550 nm and an incident angle of from 50° to 80°.

(2) White Brightness

The entire screen of a liquid crystal display apparatus having incorporated thereinto each of backlight units obtained in Example and Comparative Examples was caused to display a white color, and its brightness in a front direction was measured with a conoscope manufactured by Autronic-Melchers GmbH.

(3) Light Leakage in Oblique Direction

The entire screen of the liquid crystal display apparatus having incorporated thereinto each of the backlight units obtained in Example and Comparative Examples was caused to display a black color, and light leakage in an oblique direction was visually observed.

[Production Example 1] Preparation of Coating Liquid for Forming Low-Refractive Index Layer (1) Gelation of Silicon Compound 0.95 g of methyltrimethoxysilane (MTMS) that was a precursor of a silicon compound was dissolved in 2.2 g of dimethyl sulfoxide (DMSO). Thus, a mixed liquid A was prepared. 0.5 g of a 0.01 mol/L aqueous solution of oxalic acid was added to the mixed liquid A, and the mixture was stirred at room temperature for 30 minutes so that MTMS was hydrolyzed. Thus, a mixed liquid B containing tris(hydroxy)methylsilane was produced.

0.38 g of 28 wt % ammonia water and 0.2 g of pure water were added to 5.5 g of DMSO, and then the mixed liquid B was further added to the mixture, followed by stirring at room temperature for 15 minutes to perform the gelation of tris(hydroxy)methylsilane. Thus, a mixed liquid C containing a gel-like silicon compound was obtained.

(2) Aging Treatment

Aging treatment was performed by incubating the mixed liquid C containing the gel-like silicon compound, which had been prepared as described above, as it was at 40° C. for 20 hours.

(3) Pulverization Treatment

Next, the gel-like silicon compound subjected to the aging treatment as described above was crushed into granular shapes each having a size of from several millimeters to several centimeters with a spatula. Next, 40 g of isopropyl alcohol (IPA) was added to the mixed liquid C, and the mixture was lightly stirred. After that, the mixture was left at rest at room temperature for 6 hours so that the solvent and the catalyst in the gel were decanted. Similar decantation treatment was performed three times to replace the solvent with IPA. Thus, a mixed liquid D was obtained. Next, the gel-like silicon compound in the mixed liquid D was subjected to pulverization treatment (high-pressure media-less pulverization). The pulverization treatment (high-pressure media-less pulverization) was performed as follows: a homogenizer (manufactured by SMT Co., Ltd., product name: "UH-50") was used, and 1.85 g of the gel-like silicon compound and 1.15 g of IPA in the mixed liquid D were weighed in a 5-cubic centimeter screw bottle, followed by the performance of the pulverization of the mixture under the conditions of 50 W and 20 kHz for 2 minutes.

The gel-like silicon compound in the mixed liquid D was pulverized by the pulverization treatment, and hence the mixed liquid was turned into a sol liquid of the pulverized products (a mixed liquid D'). A volume-average particle diameter representing a variation in particle size of the pulverized products in the mixed liquid D' was determined to be from 0.50 to 0.70 with a dynamic light scattering-type nanotrack particle size analyzer (manufactured by Nikkiso Co., Ltd., model UPA-EX150). Further, a methyl ethyl ketone (MEK) solution of a photobase generator (Wako Pure Chemical Industries, Ltd.: product name: WPBG-266) having a concentration of 1.5 wt % and a MEK solution of bis(trimethoxysilyl)ethane having a concentration of 5% were added at ratios of 0.062 g and 0.036 g, respectively to 0.75 g of the sol liquid (mixed liquid D'). Thus, a coating liquid for forming a low-refractive index layer was obtained.

[Production Example 2] Preparation of Pressure-Sensitive Adhesive for Forming Pressure-Sensitive Adhesive Layer 90.7 Parts of butyl acrylate, 6 parts of N-acryloylmorpholine, 3 parts of acrylic acid, 0.3 part of 2-hydroxybutyl acrylate, and 0.1 part by weight of 2,2'-azobisisobutyronitrile serving as a polymerization initiator were loaded into a four-necked flask including a stirring blade, a temperature gauge, a nitrogen gas-introducing tube, and a condenser together with 100 g of ethyl acetate, and a nitrogen gas was introduced to purge the flask with nitrogen while the mixture was gently stirred. After that, a liquid temperature in the flask was kept at around 55° C., and a polymerization reaction was performed for 8 hours to prepare an acrylic polymer solution. 0.2 Part of an isocyanate cross-linking agent (CORONATE L manufactured by Nippon Polyurethane Industry Co., Ltd., tolylene diisocyanate adduct of trimethylolpropane), 0.3 part of benzoyl peroxide (NYPER BMT manufactured by Nippon Oil & Fats Co., Ltd.), and 0.2 part of γ-glycidoxypropylmethoxysilane (manufactured by Shin-Etsu Chemical Co., Ltd.: KBM-403) were blended into 100 parts of the solid content of the resultant acrylic polymer solution to prepare an acrylic pressure-sensitive adhesive solution. Next, the acrylic pressure-sensitive adhesive solution was applied to one surface of a silicone-treated polyethylene terephthalate (PET) film (manufactured by Mitsubishi Chemical Polyester Film Co., Ltd., thickness: 38 μm) so that the thickness of a pressure-sensitive adhesive layer after drying became 20 μm, followed by drying at 150° C. for 3 minutes. Thus, the pressure-sensitive adhesive layer was formed. The resultant pressure-sensitive adhesive layer had a storage modulus of elasticity of $1.3\times10^5$ (Pa).

[Production Example 3] Preparation of Black Ink for Forming Light-Absorbing Layer 100 Parts of a binder resin (acrylic resin: manufactured by Kyoeisha Chemical Co., Ltd., product name: LIGHT ACRYLATE PE-3A), 100 parts of carbon black, and 200 parts of a solvent for viscosity adjustment (methyl ethyl ketone: MEK) were mixed, and the mixture was subjected to high-dispersion treatment with an ultrasonic wave to prepare a black ink.

[Production Example 4] Production of Optical Pressure-Sensitive Adhesive Film

The coating liquid for forming a low-refractive index layer prepared in Production Example 1 was applied to a substrate having a thickness of 30 μm (acrylic film). The wet thickness (thickness before drying) of the coating layer was about 27 μm. The coating layer was treated at a temperature of 100° C. for 1 minute to be dried. Thus, a low-refractive index layer (thickness: 0.9 μm) was formed on the substrate. The resultant low-refractive index layer had a porosity of 58 vol % and a refractive index of 1.18. Next, a pressure-sensitive adhesive layer (thickness: 10 μm) including the pressure-sensitive adhesive prepared in Production Example 2 was formed on the surface of the low-refractive index layer. Further, the black ink prepared in Production Example 3 was printed on the surface of the substrate by gravure printing to form a light-absorbing layer (thickness: 3 μm). Thus, an optical pressure-sensitive adhesive film 1 having the configuration "light-absorbing layer/substrate/low-refractive index layer/pressure-sensitive adhesive layer" was produced.

[Production Example 5] Production of Optical Pressure-Sensitive Adhesive Film

An optical pressure-sensitive adhesive film 2 having the configuration "substrate/low-refractive index layer/pressure-sensitive adhesive layer" was produced in the same manner as in Production Example 4 except that no light-absorbing layer was formed.

[Production Example 6] Production of Optical Pressure-Sensitive Adhesive Film

An optical pressure-sensitive adhesive film 3 having the configuration "light-absorbing layer/substrate/pressure-sensitive adhesive layer" was produced in the same manner as in Production Example 4 except that no low-refractive index layer was formed.

Example 1

A backlight unit was taken out from a commercial liquid crystal display apparatus (manufactured by King Jim Co., Ltd., product name: "XMC10"). A light guide plate was taken out from the backlight unit (substantially, a casing), and the optical pressure-sensitive adhesive film 1 obtained in Production Example 4 was bonded to the portion of the light guide plate to be brought into contact with the front portion of the casing. The light guide plate having bonded thereto the optical pressure-sensitive adhesive film 1 was incorporated into the backlight unit again, and the backlight unit was incorporated into the liquid crystal display apparatus again. The resultant liquid crystal display apparatus was subjected to the evaluations (2) and (3). The results are shown in Table 1.

Comparative Example 1

The backlight unit was incorporated into the liquid crystal display apparatus in the same manner as in Example 1 except that the optical pressure-sensitive adhesive film 2 obtained in Production Example 5 was used instead of the optical pressure-sensitive adhesive film 1. The resultant liquid crystal display apparatus was subjected to the same evaluations as those of Example 1. The results are shown in Table 1.

Comparative Example 2

The backlight unit was incorporated into the liquid crystal display apparatus in the same manner as in Example 1 except that the optical pressure-sensitive adhesive film 3 obtained in Production Example 6 was used instead of the optical pressure-sensitive adhesive film 1. The resultant liquid crystal display apparatus was subjected to the same evaluations as those of Example 1. The results are shown in Table 1.

Comparative Example 3

The backlight unit was incorporated into the liquid crystal display apparatus in the same manner as in Example 1 except that no optical pressure-sensitive adhesive film was used. That is, the backlight unit of the commercial liquid crystal display apparatus was used as it was. The liquid crystal display apparatus was subjected to the same evaluations as those of Example 1. The results are shown in Table 1.

TABLE 1

| | Example 1 | Comparative Example 1 | Comparative Example 2 | Comparative Example 3 |
|---|---|---|---|---|
| Configuration | Front portion of casing/ light-absorbing layer/ substrate/ low-refractive index layer/ pressure-sensitive adhesive layer/ light guide plate | Front portion of casing/ — substrate/ low-refractive index layer/ pressure-sensitive adhesive layer/ light guide plate | Front portion of casing/ light-absorbing layer/ substrate/ — pressure-sensitive adhesive layer/ light guide plate | Front portion of casing/ — — — — light guide plate |
| White brightness ($cd/m^2$) | 320 | 348 | 237 | 305 |
| Light leakage | Absent | Present | Absent | Present |

As is apparent from Table 1, it is understood that according to Example of the present invention, a backlight unit, which is bright and is suppressed from causing light leakage in an oblique direction, can be achieved. Further, it is understood that the liquid crystal display apparatus using the backlight unit of Example of the present invention is brighter than the liquid crystal display apparatus of Comparative Example 3 free of any light-absorbing layer is, despite including the light-absorbing layer. Further, in consideration of the fact that the liquid crystal display apparatus of Comparative Example 2 including only the light-absorbing layer is extremely dark, it is understood that the combination of the light-absorbing layer and the low-refractive index layer exhibits a synergistic effect much higher than that of the simple total sum thereof.

INDUSTRIAL APPLICABILITY

The backlight unit of the present invention may be suitably used as the backlight unit of an image display apparatus (in particular, a liquid crystal display apparatus).

REFERENCE SIGNS LIST

10 light source
20 light guide plate
30 casing
31 front portion
32 back portion
40 optical pressure-sensitive adhesive film
41 light-absorbing layer
42 substrate
43 low-refractive index layer
44 pressure-sensitive adhesive layer
100 backlight unit

The invention claimed is:

1. A backlight unit, comprising:
a light source;
a light guide plate having:
an end surface that is arranged to face the light source, and that light from the light source enters; and
an emitting surface from which the entered light is emitted;
a casing having a front portion and a back portion, the casing being configured to store the light source and the light guide plate; and
an optical pressure-sensitive adhesive film arranged only between the front portion of the casing on a light source side and the light guide plate, the optical pressure-sensitive adhesive film being bonded to the light guide plate,
wherein the optical pressure-sensitive adhesive film includes a light-absorbing layer, a substrate, a low-refractive index layer, and a pressure-sensitive adhesive layer in the stated order from a front portion side of the casing.

2. The backlight unit according to claim 1, further comprising a reflective plate arranged in the casing on a back surface side of the light guide plate.

3. The backlight unit according to claim 2, wherein the reflective plate is arranged via an air layer between the reflective plate and the light guide plate.

4. The backlight unit according to claim 2, wherein the reflective plate and the light guide plate are bonded to each other via a double-sided pressure-sensitive adhesive film including a low-refractive index layer.

5. The backlight unit according to claim 1, wherein the light source is a LED light source.

6. An image display apparatus, comprising:
the backlight unit of claim 1; and
an image display panel arranged on an emitting surface side of the light guide plate.

7. The backlight unit according to claim 1, wherein the light-absorbing layer is a black colored layer and has a total light transmittance of 0.01% or less in a thickness of from 3 μm to 5 μm.

8. The backlight unit according to claim 1, wherein the light-absorbing layer has a thickness of from 0.1 μm to 300 μm.

9. The backlight unit according to claim 1, wherein the low-refractive index layer has pores therein and the porosity of the low-refractive index layer is 40% or more and 85% or less.

10. The backlight unit according to claim 9, wherein a size of each of the pores in the low-refractive index layer is from 2 nm to 500 nm.

11. The backlight unit according to claim 1, wherein the low-refractive index layer has a refractive index of 1.30 or less.

12. The backlight unit according to claim 1, wherein the low-refractive index layer has a haze of less than 5%.

13. The backlight unit according to claim 1, wherein the low-refractive index layer has a thickness of from 0.2 μm to 5 μm.

14. The backlight unit according to claim 1, wherein the low-refractive index layer is formed of one or a plurality of kinds of constituent units each forming a fine pore structure, and the constituent units are chemically bonded to each other through a catalytic action.

15. A backlight unit, comprising:
a light source;
a light guide plate having:
an end surface that is arranged to face the light source, and that light from the light source enters; and
an emitting surface from which the entered light is emitted;
a casing having a front portion and a back portion, the casing being configured to store the light source and the light guide plate; and
an optical pressure-sensitive adhesive film arranged only between the front portion of the casing on a light source side and the light guide plate, the optical pressure-sensitive adhesive film being bonded to the light guide plate,
wherein the optical pressure-sensitive adhesive film includes a light-absorbing layer, a substrate, a low-refractive index layer, and a pressure-sensitive adhesive layer in the stated order from a front portion side of the casing,
wherein the light-absorbing layer is a black colored layer, has a total light transmittance of 0.01% or less in a thickness of from 3 μm to 5 μm, and has a thickness of from 0.1 μm to 300 μm,
wherein the low-refractive index layer is formed of one or a plurality of kinds of constituent units each forming a fine pore structure, and the constituent units are chemically bonded to each other through a catalytic action,
wherein the low-refractive index layer has pores therein and the porosity of the low-refractive index layer is 40% or more and 85% or less,
wherein a size of each of the pores in the low-refractive index layer is from 2 nm to 500 nm, and
wherein the low-refractive index layer has a refractive index of 1.30 or less, has a haze of less than 5%, and has a thickness of from 0.2 μm to 5 μm.

* * * * *